United States Patent
Guyomard et al.

(10) Patent No.: US 6,612,387 B2
(45) Date of Patent: *Sep. 2, 2003

(54) DEVICE FOR DIRECTLY MOUNTING AN EQUIPMENT, IN PARTICULAR A HEAT EXCHANGER, ON A MOTOR VEHICLE STRUCTURAL ELEMENT

(75) Inventors: Jean-Nicolas Guyomard, Le Mesnil Fuguet (FR); Jacques Sigonneau, Theuvy Acheres (FR); Jean-Claude Naty, Argenteuil (FR)

(73) Assignees: Valeo Thermique Moteur (FR); Valeo Vision (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/555,466
(22) PCT Filed: Sep. 28, 1999
(86) PCT No.: PCT/FR99/02302
§ 371 (c)(1), (2), (4) Date: May 30, 2000
(87) PCT Pub. No.: WO00/18605
PCT Pub. Date: Apr. 6, 2000

(65) Prior Publication Data
US 2002/0112906 A1 Aug. 22, 2002

(30) Foreign Application Priority Data
Sep. 30, 1998 (FR) .............................. 98/12233

(51) Int. Cl.⁷ .............................................. B50K 11/04
(52) U.S. Cl. ....................... 180/68.4; 267/141
(58) Field of Search ................................ 180/68.4, 68.6; 267/141, 153

(56) References Cited

U.S. PATENT DOCUMENTS

| 2,755,874 | A | * | 7/1956 | Adloff | 180/68.4 |
| 3,121,467 | A | * | 2/1964 | Bryant | 180/68.4 |
| 4,269,400 | A | * | 5/1981 | Jensen | 267/153 |
| 4,651,839 | A | | 3/1987 | Isobe | |
| 4,834,348 | A | * | 5/1989 | Jordens et al. | 267/141 |
| 4,869,479 | A | * | 9/1989 | Colonel et al. | 267/141 |

FOREIGN PATENT DOCUMENTS

| DE | 21 37 121 | 2/1973 |
| DE | 195 24 668 | 3/1998 |
| EP | 0 843 146 | 5/1998 |

OTHER PUBLICATIONS

International Search Report dated Jan. 21, 2000.

\* cited by examiner

Primary Examiner—Kenneth R. Rice
Assistant Examiner—Elaine Gort
(74) Attorney, Agent, or Firm—Morgan & Finnegan, LLP

(57) ABSTRACT

The invention concerns a device wherein the equipment and the support formed by the motor vehicle structural element are assembled in at least one point by to matching co-operating element. The equipment co-operating element is elastically deformable for being spaced from or brought close to the support, to enable direct interlocking at said point for mounting with means for cushioning the equipment on the support. The equipment is in particular a heat exchanger comprising an array of tubes assembled at each of their opposite ends by a collector plate closed by a fluid box, the equipment co-operating element being then a structural part of the fluid box.

11 Claims, 1 Drawing Sheet

DEVICE FOR DIRECTLY MOUNTING AN EQUIPMENT, IN PARTICULAR A HEAT EXCHANGER, ON A MOTOR VEHICLE STRUCTURAL ELEMENT

BACKGROUND OF THE INVENTION

The invention relates to the mounting of motor vehicle equipment on a part of this vehicle.

In particular, it relates to the mounting of heat exchangers, for example the radiator of the cooling circuit of the engine, or in addition the radiator for heating the passenger compartment or the condenser of the air-conditioning circuit.

It applies in particular—but in a non-restrictive manner—to the mounting of these items of equipment on a front face of a vehicle, in particular produced in the form of a single-unit module provided with various items of equipment, prepared and provided by the supplier, ready to be mounted on the vehicle by the manufacturer.

Until present, the heat exchanger has been fixed to the structural element of the vehicle by means of metal springs fixed at the upper region of the structural element, on the one hand, and elastic cushioning blocks in the lower portion, on the other hand.

The springs enable the various dimensional tolerances to be accommodated and allows the mounting of different types of radiators by virtue of their flexibility. With respect to the blocks, they ensure the cushioning and centering on the support.

However, this mounting technique requires the positioning of mounted elements (springs and fixing pins) implying a additional cost by virtue of the necessity of providing supplementary parts and the time required for mounting them in the assembly process.

BRIEF SUMMARY OF THE INVENTION

One of the objects of the invention is to remove this difficulty, by proposing a new mounting configuration that allows the number of parts necessary for assembly to be reduced, rapid mounting to be ensured and adequate flexibility to be retained in order to accept several types of different items of equipment.

For this purpose, the invention proposes a device for mounting an item of equipment for a motor vehicle on a structural element of said motor vehicle, which forms the support for this item of equipment, in which the item of equipment and the support are joined at one point at least by two matching cooperating elements, and in which the cooperating element of the item of equipment is elastically deformable as it is moved away from or brought closer to the support, to enable, by direct interlocking at the said point, mounting with the cushioning of the item of equipment on the support.

The item of equipment may in particular be a heat exchanger comprising an array of tubes assembled at each of their opposite ends by a collector plate closed by a fluid tank, the cooperating element of the equipment then being a structural part of the fluid tank.

In particular, the fluid tank may be formed so as to have a recess turned towards the support and cooperating with a matching finger borne by said support and received by the recess, or vice versa, so as to have a stud turned towards the support and cooperating with a matching aperture formed on said support and receiving the stud.

The recess or the stud of the fluid tank may be situated at the site of a counter-curve formed either at the ends, or at the top of the fluid tank.

This counter-curve is advantageously adjacent to a main curve, so as to form a curve inversion. This main curve may comprise at least one arc that comes to join the counter-curve.

The invention very advantageously applies to the case in which the structural element of the vehicle is a front module.

From another viewpoint, the invention relates to a structural element of a motor vehicle, comprising a mounting device as defined above.

BRIEF DESCRIPTION OF THE DRAWING

Other characteristics of the invention will become apparent from the description of an example below, made by reference to the attached drawings.

DETAILED DESCRIPTION OF THE INVENTION

On the figures, the reference 10 generally designates a heat exchanger for a motor vehicle, for example (but in a non-restrictive manner) a radiator for cooling the engine. Such an exchanger is formed by an array of tubes 12 performing the heat exchange with the exterior atmosphere. The tubes of the array are joined on either side by two end blocks that define the direction of the circulation of the liquid in the tubes and enable the liquid to be introduced into the exchanger and to be removed therefrom.

Each of the end blocks comprises a collector plate into which the tubes of the array open and with which a bonnet or "fluid tank" is associated, which is tightly connected, or collector so as to form a common volume in fluid communication with the tubes of the array.

The invention proposes incorporating the fixing and cushioning functions formerly reserved for springs and studs mounted on the structural element supporting the radiator, in the fluid tank of the radiator.

Figure 1:
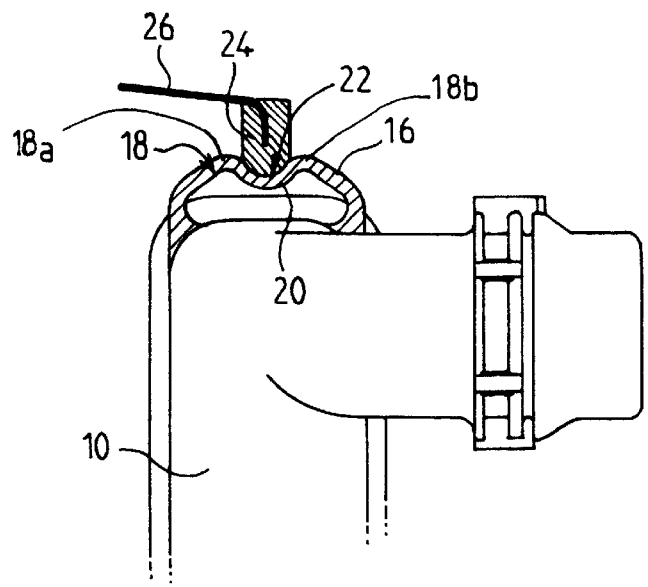
FIG. 1 shows a first embodiment of the mounting device of the invention.
Figure 2:
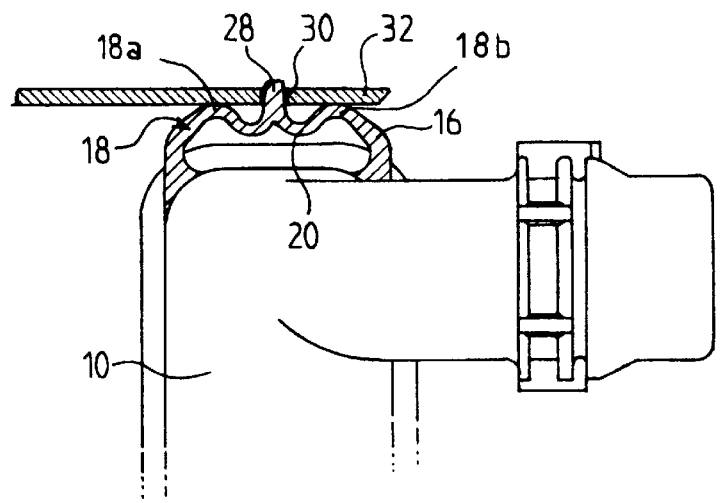
FIG. 2 shows a second embodiment of the mounting device of the invention.

For this purpose, at its ends the fluid tank 14 comprises regions 16 configured in the manner that is illustrated in further detail in FIG. 1 or FIG. 2.

Figure 3:
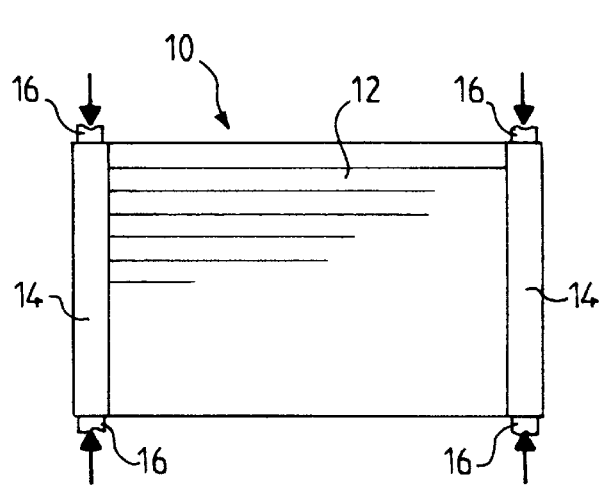
FIGS. 3 and 4 illustrate two possible configurations for mounting a vehicle heat exchanger, one vertical and the other horizontal.
Figure 4:
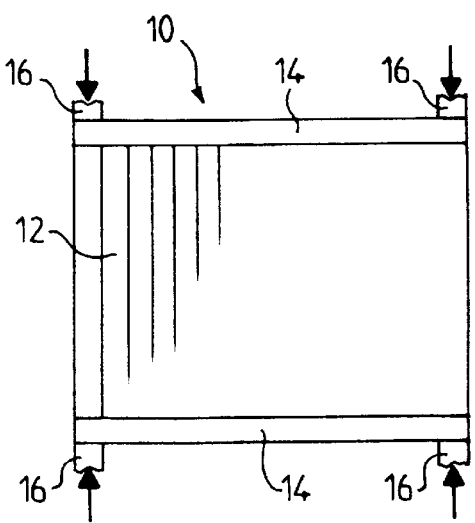

In the case of a radiator having horizontal tubes and vertical fluid tanks (FIG. 3), the regions 16 are situated at the end of each of the fluid tanks 14. In contrast, in the case of a configuration with vertical tubes and horizontal fluid tanks (FIG. 4), the regions 16 are no longer situated at the end of each fluid tank, but at the top of the end regions thereof (on FIGS. 3 and 4 the arrows indicate the attachment points to the structural element of the vehicle).

The mounting configuration according to the invention may take either one of the forms illustrated in FIGS. 1 and 2, it being possible to combine these two forms of mounting, for example that in the upper part of FIG. 1 and that in the lower part of FIG. 2, or vice versa.

In the case of FIG. 1, the region 16 of the radiator tank is formed so as to have an inverted curve, with a main curve 18 and a counter-curve 20, so as to give it a so-called "lyre" shape, structurally having its own elasticity. The main curve 18 comprises two arcs of a curve 18a and 18b on either side of the counter-curve 20. The counter-curve 20 forms a recess 22 receiving a matching finger 24 integral with a support element 26 for the front face support.

In the implementation of FIG. 2, the counter-curve 20 of the lyre bears a stud 28 intended to engage in a matching aperture of an element 32 of the front support.

Both in the case of FIG. 1 and that of FIG. 2, it may be specified that the main curve 18 only has a single arc of a curve 18a or 18b which comes to join the counter-curve 20.

As can be easily noted, in one or the other case, the particular configuration of the lyre formed on the fluid tank of the radiator, with the recess 20 or the stud 28, enables very easy mounting by simple clipping onto the front support, with immediate centering of the radiator on the support and whilst retaining the desired cushioning by virtue of the elasticity of the lyre 18.

What is claimed is:

1. A single-unit module adapted for mounting on a motor vehicle comprising:
   a structural element; and
   an item of equipment comprising a lyre-shaped exterior surface configured to physically contact the structural element at a point, and to be elastically deformable in at least a region of the point and to provide cushioning with respect to the structural element and a recess and
   wherein the structural element is adapted to engage and bear against the recess.

2. The module according to claim 1 wherein the item of equipment is a hear exchanger comprising an array of tubes joined at each of their opposite ends by a collector plate closed by a fluid tank.

3. The module according to claim 2, wherein the recess is situated at a site of a counter-curve formed at the ends of the fluid tank.

4. The module according to claim 3, wherein the counter-curve is adjacent to a main curve so as to form a curve inversion.

5. The module according to claim 4, wherein the main curve comprises at least one arc which comes to join the counter-curve.

6. The module according to claim 2, wherein the recess is situated at a site of a counter-curve formed at a top of the fluid tank.

7. The module according to claim 6, wherein the counter-curve is adjacent to a main curve so as to form a curve inversion.

8. The module according to claim 1, wherein the structural element of the vehicle is a front module.

9. The module of claim 1, wherein the item of equipment is clipped onto the structural element to provide both centering and cushioning of the item with respect to the structural element.

10. The module of claim 1, wherein the recess is structurally shaped to provide elasticity.

11. A single-unit module adapted for mounting on a motor vehicle comprising:
    a structural element comprising a support element extending in a direction and an integrally formed finger extending roughly perpendicular to the direction from an end of the support element; and
    an item of equipment having a lyre-shaped exterior surface configured to physically contact the structural element at a point, and to be elastically deformable in at least a region of the paint and to provide cushioning with respect to the structural element,
    wherein the item of equipment comprises a radiator having an array of tubes and a plurality of fluid tanks, a region of one of the tanks formed with a pair of arcs and a counter curve disposed between the arcs, and
    wherein the integrally fanned finger is in direct interlock with the counter curve of the radiator.

* * * * *

UNITED STATES PATENT AND TRADEMARK OFFICE
CERTIFICATE OF CORRECTION

PATENT NO.    : 6,612,387 B2
DATED         : September 2, 2003
INVENTOR(S)   : Jean-Nicolas Guyomard, Jacques Sigonneau and Jean-Claude Naty It is certified that error appears in the above-identified patent and that said Letters Patent is hereby corrected as shown below:

<u>Column 3,</u>
Line 29, the word "hear" should be replaced with -- heat --.

<u>Column 4,</u>
Line 28, the word "paint" should be replaced with -- point --.
Line 34, the word "fanned" should be replaced with -- formed --.

Signed and Sealed this

Fourteenth Day of October, 2003

JAMES E. ROGAN
*Director of the United States Patent and Trademark Office*